(12) United States Patent
Skandan et al.

(10) Patent No.: US 8,263,524 B1
(45) Date of Patent: Sep. 11, 2012

(54) ENVIRONMENTALLY BENIGN SORBENTS FOR REMOVING MERCURY FROM FLUE GAS

(75) Inventors: Ganesh Skandan, Easton, PA (US); Mohit Jain, East Brunswick, NJ (US)

(73) Assignee: NEI, Corp., Piscataway, NJ (US)

( * ) Notice: Subject to any disclaimer, the term of this patent is extended or adjusted under 35 U.S.C. 154(b) by 125 days.

(21) Appl. No.: 12/776,577

(22) Filed: May 10, 2010

Related U.S. Application Data

(60) Provisional application No. 61/215,887, filed on May 11, 2009.

(51) Int. Cl.
| | |
|---|---|
| B01J 20/00 | (2006.01) |
| C01B 31/08 | (2006.01) |
| B32B 5/16 | (2006.01) |
| B32B 9/00 | (2006.01) |
| B32B 15/02 | (2006.01) |
| B32B 17/02 | (2006.01) |
| B32B 19/00 | (2006.01) |
| B32B 21/02 | (2006.01) |
| B32B 23/02 | (2006.01) |
| B32B 27/02 | (2006.01) |

(52) U.S. Cl. ......... 502/400; 502/417; 502/425; 428/403
(58) Field of Classification Search .................. 502/400, 502/407–413, 415–417, 425; 423/210; 210/688, 210/914; 523/215; 428/403
See application file for complete search history.

(56) References Cited

U.S. PATENT DOCUMENTS

| | | | | |
|---|---|---|---|---|
| 5,853,690 A | * | 12/1998 | Hibino et al. | 423/483 |
| 5,916,934 A | * | 6/1999 | Mahmud et al. | 523/215 |
| 5,919,855 A | * | 7/1999 | Reed et al. | 524/496 |
| 6,013,187 A | * | 1/2000 | Burns et al. | 210/688 |
| 6,191,194 B1 | * | 2/2001 | Anand et al. | 523/212 |
| 6,719,828 B1 | * | 4/2004 | Lovell et al. | 95/134 |
| 6,787,029 B2 | * | 9/2004 | Gaudet et al. | 210/198.2 |
| 7,557,064 B2 | * | 7/2009 | Zhou et al. | 502/407 |
| 7,628,844 B2 | * | 12/2009 | Hua | 95/134 |
| 2010/0242722 A1 | * | 9/2010 | Belanger et al. | 95/8 |

OTHER PUBLICATIONS

Dong et al., "Engineering and characterization of mesoporous silica-coated magnetic particles for mercury removal from industrial effluents", Applied Surface Science 254 (2008) 3522-3530. Available online Dec. 3, 2007.*

Oliveira et al., "Activated carbon/iron oxide magnetic composites for the adsorption of contaiminants in water", Carbon 40 (2002) 2177-2183.*

Makkuni et al., "Aqueous and vapor phase mercury sorption by inorganic oxide materials functionalized with thiols and poly-thiols", Clean. Techn. Environ Policy (2005) 7: 87-96.*

* cited by examiner

*Primary Examiner* — Stanley Silverman
*Assistant Examiner* — Anthony J Zimmer
(74) *Attorney, Agent, or Firm* — William L. Botjer

(57) ABSTRACT

A new class of carbon-based sorbents for vapor-phase mercury removal is disclosed in this invention. The optimum structure of the sorbent particles, and a method to produce the sorbent, are described. The sorbent is based on carbon particles with a metal-oxide coating on the surface. The thin metal-oxide layer acts as a barrier for the adsorption of Air Entrainment Admixture (AEA), the component used to stabilize bubbles in cement), thereby enhancing its concrete friendliness. The metal-oxide is coated on the surface of carbon, using a solution-based method. The metal-oxide coated carbon was further modified with sulfur molecules, to increase its mercury removal capacity.

19 Claims, 4 Drawing Sheets

ENVIRONMENTALLY BENIGN SORBENTS FOR REMOVING MERCURY FROM FLUE GAS

CROSS REFERENCE TO RELATED APPLICATIONS

This application claims priority of U.S. provisional application No. 61/215,887 filed May 11, 2009.

STATEMENT OF GOVERNMENT SUPPORT OF INVENTION

The work leading to the present application was done as part of DOE Grant Number: DE-FG02-07ER84714.

BACKGROUND OF THE INVENTION

This invention relates to the use of certain nanoscale particles as a sorbent to remove mercury from flue gas. Under the EPA's Clean Air Mercury Rule, coal fired power plants are required to drastically reduce the amount of mercury (Hg) emissions within the next several years. One of the technologies under consideration for removal of Hg is the use of chemically treated (brominated) activated carbon. It has been noted that utility companies may need to take into account the impact of a recent court decision, which specifies that a power plant cannot implement a mercury control solution that could potentially increase the amount of a secondary pollutant, unless additional controls for that pollutant are installed. This could be an issue in the case of brominated activated carbon, as bromine emissions can have adverse environmental effects. Compared to chlorine, bromine is considered to be more potent in depleting the atmospheric ozone layer. There are additional corrosion issues related to the presence of bromine in the system. Further, a majority of these activated carbons are not concrete-friendly, i.e. the fly ash containing the activated carbon particles cannot be used in concrete. This leads to loss of revenue to the power plants on two counts: (i) loss of revenue due to lack of usability of fly ash; and (ii) cost of disposing unusable fly ash in landfills. Additionally, the use of fly ash has an important consequence for the environment: if all of the fly ash produced can be used as replacement for cement, it can reduce $CO_2$ emissions equivalent to that generated by 25% of the world's automotives.

Coal fired power plants constitute ~52% of the total electricity produced in the United States. As the demand for electricity increases, utility companies are increasing the generating capacity as well. Additionally, many of the current nuclear plants will be "retired" in the first quarter of the $21^{st}$ century. Due to poor public support for nuclear energy, these nuclear plants are likely to be replaced by coal fired plants. At the current consumption rate, it is estimated that the world has ~1500 years of coal reserves. This leads to the recent steady increase in the amount of coal consumed in the world and in the US. This implies that the mercury emission issue associated with coal-fired power plants needs to be resolved in the long run.

An estimated total of 48 tons of mercury is emitted every year in the US from coal-fired power plants, which is $\frac{1}{3}^{rd}$ of the total mercury emissions per year in the US. On a worldwide scale, this is a much larger issue, since countries such as China and India are using increasing amounts of energy derived from fossil fuels. Under the Clear Skies Initiative, the target is to reduce mercury emission by about 45% by 2010, and about 70% by 2018. New technologies will need to be developed to reach these targets. According to DoE, the market penetration for mercury emission reduction technologies is an estimated 320,000 megawatts. In order to achieve the target reduction by 2018, the additional annual cost for energy generation will be $2 billion to $6 billion per year, if the existing activated carbon (current estimate is $18,000-$131,000 per pound of mercury removal, using activated carbon technology.

A major issue is the usability of fly ash containing mercury adsorbed activated carbon (it cannot be used if the mercury content is high), which further increases the cost of using activated carbon technology for mercury removal. Fly ash is a valuable by-product from coal-fired power plants. In making concrete, cement is mixed with water to act as an adhesive to hold strong aggregates. Fly ash is added during the process, as it is observed that concrete containing fly ash is easier to work with, and it uses 10% less water. Additionally, fly ash reacts with lime that is given off by cement hydration, creating more bonding agent to hold the concrete together, which makes concrete stronger with time, compared to concrete without fly ash. Further, it reduces the amount of cement required to make concrete. While a ton of cement costs $80-$100, fly ash costs only $32/ton making it more competitive than cement. Manufacturing one ton of cement requires 6.5 million BTUs of energy, and it is estimated that cement plants produce 7% of the total $CO_2$ emission by human sources. If all the fly ash produced can be used to partly replace cement in concrete, it can eliminate $CO_2$ emissions equivalent to that of 25% of the automotives in the world. Clearly, there are environmental and societal benefits that are derived from lower mercury and $CO_2$ emissions. Also, the use of fly ash will save landfill space. However, even the presence of less than 1% of activated carbon in fly ash can make it useless for mixing with concrete, by changing its properties.

Therefore, it is imperative that any sorbent used for removing mercury from flue gas be concrete-friendly. Conventional activated carbon is not concrete-friendly, and most brominated activated carbons are not concrete-friendly either. Recently, it has been reported that some brominated activated carbon may be concrete friendly, but the negative environmental effects of bromine are yet to be studied and not known at the moment. Additionally, bromine is a highly corrosive gas, and as such the impact on the exhaust ducts could be a problem.

Currently, various types of activated carbons are being extensively studied for mercury removal from flue gas. DOE/NETL has carried out several field tests of activated carbons due to their high removal efficiency. Three prominent brands of activated carbons which have been tested in the field are NORIT Americas (Darco® Hg-LH), Alstom Power Plant Laboratories (Mer-Clean™), and Sorbent Technologies Corporation (B-PAC™). Results indicated that activated carbon consistently performed well in mercury removal, on a full-scale test. However, secondary pollution (bromine), corrosion from bromine and concrete friendliness is still an issue, affecting their overall performance.

Another media which is used to remove mercury from flue gas is based on "clay", and is manufactured by Amended Silicates. However, when the performance of this media was compared with various types of activated carbon sorbents the amended silicate media did not perform as well as activated carbon. Others used a fluidized bed of zeolite and activated carbon for the removal of organics and metals form gas streams. Zeolites are aluminosilicate materials that are extensively used as adsorbents for gas separation and purification, and they are also used as ion-exchange media for water treatment and purification. Zeolites have "open" crystal structures, constructed from tetrahedra ($TO_4$, where T=Si, Al). It has been observed that the removal efficiency of metals present in gases by activated carbon is higher than that of zeolite, and the temperature only slightly influences the removal efficiency. A study tested treated Zeolite and observed 63% mercury removal efficiency.

U.S. Pat. No. 6,610,263 is directed to the use of high surface area $MnO_x$ to remove Hg. It is claimed that it has the capability to remove 99% of elemental Hg and 94% of the total mercury content in flue gas. However, the cost is likely to be a concern for using this media in practical applications.

Biswas et-al [T. M. Owens and P. Biswas, J. Air & Waste Manage. Assoc., n46, 1996, p 530] have developed a gas-phase sorbent precursor method, where a high surface area agglomerated sorbent oxide particle is produced in situ in the combustor. These sorbents are stable at elevated temperatures and provide a surface of metallic vapors (for condensation) and reaction. They used titanium isopropoxide as precursor, which decomposed at elevated temperature and formed particles of titania. Hg vapors were found to condense on these particles in the presence of UV radiation which helps in the oxidation of mercury vapors and formation of a strong bond between mercury and titania. They [P. Biswas and M. Zachariah, "In situ immobilization of lead species in combustion environments by injection of gas phase silica sorbent precursors", Env. Sci. & Tech., v31, n9, 1997, p 2455] also used silica precursors for the removal of lead from flue gas, and were able to get 80-90% lead removal efficiency. The removal efficiency was found to be a function of the gas temperature. Additionally, the efficiency was observed to decrease with increase in temperature.

Another group has shown the feasibility of using a fluidized bed for the removal of metals, such as lead, from flue gas. They used limestone, bentonite, and alumina as sorbents, and observed that the effectiveness of the fluidized bed depends on sorbent species, sorbent particle size, amount of sorbent used, metal to sorbent ratio, metal concentration in the waste, air velocity, and temperature. Smaller particles showed better efficiency compared to larger particles (particle range 400-700 μm). In case of limestone, it increased from 60% to 70% when the particle size was decreased from 700 to 500 μm, all other conditions remaining same. The sorbents showed better efficiency at lower temperatures (~750° C. vs. ~900° C.). This is because at higher temperatures, the vapor pressure is high, so more metal escapes as vapor.

Still others have used zeolite materials for the removal of mercury by duct injection. They were able to get between 45 and 92% metal removal depending upon the amount of sorbent injected and the type of sorbent. In the case of zeolites, there was no effect of temperature on the removal efficiency.

Gullet et-al [B. Gullet and K. Raghunathan, "Reduction of coal based metal emissions by furnace sorbent injection", Energy & Fuels, v8, 1994, p 1068] demonstrated the feasibility of using oxide minerals such as limestone, kaolinite, and bauxite as sorbents for toxic metal removal, by injecting them through the burner. They were able to get reduction in submicron size metal particles of antimony, arsenic, mercury, and selenium by hydrated lime and limestone.

SUMMARY OF THE INVENTION

The present invention is directed to sorbents for removing mercury from gas and their synthesis. The sorbent has a highly accessible surface, and selectivity towards mercury adsorption. These sorbents are halogen (bromine) free, making them environmentally safe as well as non-corrosive towards the power plant system. Certain of the non-activated carbon based sorbents, such as zeolites and oxides are concrete and environment friendly, however their mercury removal efficiency is significantly lower than activated carbon. The present invention overcomes the limitations of currently available carbon and non-carbon based sorbents by incorporation of a barrier layer on the surface of the particles.

The sorbent described in the present invention is based on carbon particles with a metal-oxide coating on the surface. The thin metal-oxide layer acts as a barrier for the adsorption of Air Entrainment Admixture (AEA, the component used to stabilize bubbles in cement), thereby enhancing its concrete friendliness. The metal-oxide is coated on the surface of carbon, using a solution-based method. The metal-oxide coated carbon was further modified with sulfur molecules, to increase their mercury removal capacity.

Two critical aspects that differentiate the newly developed carbon-based particles from other sorbent particles include: (i) suitable surface modification that leads to high affinity for mercury ions without having to use toxic elements such as bromine, and (ii) the ability to render the resulting fly ash usable in concrete and other applications, due to the low foam index. The overall mercury removal efficiency is comparable to that of the best performing commercial sorbent, which is a brominated compound.

BRIEF DESCRIPTION OF THE DRAWINGS

For a better understanding of the invention, reference is made to the following drawings which are to be taken in conjunction with the detailed description to follow in which.

DESCRIPTION OF THE PREFERRED EMBODIMENTS

Overview

A. The template material used as a sorbent is carbon black and activated carbon, as carbon-based materials are readily available. Other types of carbon particles that have a similarly open morphology can also be used. Additionally, other non-carbon materials, such as ceramic oxides, ceramic non-oxides, or clay-based particles can also be used as template for further surface modification.

B. The surface of the carbon particles was modified using a two-step process. During the first step, the surface was modified with aluminum hydroxide, to form a tie layer. This leads to the activation of the sorbent surface with aluminum hydroxide functional groups. An aqueous solution of sodium aluminate was used as the precursor for aluminum hydroxide deposition. Sodium aluminate was transformed to aluminum hydroxide, by treating it with an ion-exchange resin. The resin exchanges sodium ions to hydrogen ions. It should be noted that other inorganic compounds such as: titanium hydroxide, magnesium hydroxide, iron hydroxide, copper hydroxide can also be used as the tie layer prior to deposition of metal oxide layer.

C. The surface of carbon was further modified with a metal oxide, during the second step. In our work, we used silica because it is the least expensive among oxides and allows for easy surface modification. Other commonly known oxides, including aluminum oxide, titanium oxide, iron oxide and tin oxide can be used instead. Sodium silicate was used as silicon oxide source. An aqueous solution of sodium silicate was treated with ion-exchange resin to exchange sodium ions with hydrogen ions. The amount of silica on the surface of carbon is about 7-16% and preferably about 8-13% and more preferably about 10-12 wt %, of the total powder.

D. Silica coated carbon was further modified with sulfur molecules, to increase their mercury removal capacity. Addition of sulfur was achieved by mixing elemental sulfur with the silica coated carbon, and heating it under inert atmosphere. Other chemicals which can also be used for sulfur addition are mercaptosilane, mercapto acetic acid, and calcium polysulfide. The amount of sulfur is about 0.4-6% and preferably about 0.75-4% and more preferably about 2-3%.

Figure 1:
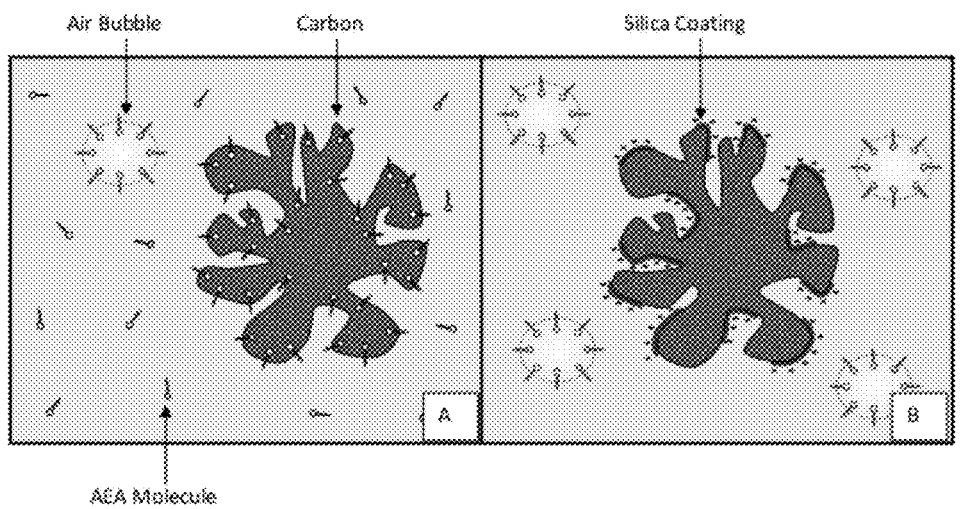
FIG. 1 depicts the mechanism to explain the effect of surface oxide layer on foam index: (A) the hydrophobic side of AEA molecule (small circle) is attracted towards carbon; (B) the hydrophobic side is repelled from silica coated carbon, due to the presence of negative charge on the surface of the carbon.

E. The unique feature of the present sorbent is the presence of silica coating on the surface of carbon. It leads to enhancement in the mercury removal efficiency of the substrate, from the flue gas. This also leads to less adsorption of AEA on the surface of carbon, leading to a low foam index, and making it more concrete friendly. The AEA molecules are typically an aqueous mixture of anionic surfactants. In concrete, AEA molecules have their hydrophobic non-polar end group aligned toward the interior of the air bubble, while the polar end group is toward either water or the cement surface (which is also polar). This leads to the stabilization of air bubbles, hence preventing them from coalescing and leaving the system. However, when carbon is present in the system, the hydrophobic end of AEA is aligned toward the surface of carbon, due to the non-polar nature of the carbon surface. This leads to the adsorption of AEA on carbon. As a consequence, a lower amount of AEA is now available for the stabilization of air bubbles, leading to a smaller number of bubbles and a commensurate increase in the foam index, FIG. 1($a$). In the case of the present sorbent, the thin silica coating on the surface of the carbon particle leads to the formation of hydroxyl groups on the surface of the sorbents. This is shown in FIG. 1($b$). The typical pH of concrete mixture is in the basic range where O—H bond, of metal oxide layer, is broken and a proton ($H^+$) is removed from the hydroxyl group, leading to an overall negative charge. This negative charge repels the negatively charged AEA, and reduces its adsorption on the surface of the sorbent, leading to an overall reduction in the foam index.

EXAMPLE 1

Synthesis and Performance of Carbon-Black Based Sorbent 1.a. Surface Modification with Sodium Aluminate A typical process for introducing aluminum hydroxide groups on the surface of carbon black is as follows: 60 g of carbon black was dispersed in 5400 mL of water, using a high shear mixer. 1.2 g of sodium aluminate was dissolved in 360 mL of water, in a separate container. The aqueous solution of sodium aluminate was passed through an ion-exchange resin (Dowex-HCR-W2), prior to the addition to carbon black slurry. The pH of the solution was maintained between 9.7 and 9.8, using an aqueous solution of sodium hydroxide and hydrochloric acid. The treated powder was filtered, and dried in an oven.

1.b. Surface Modification with Sodium Silicate

Figure 2:
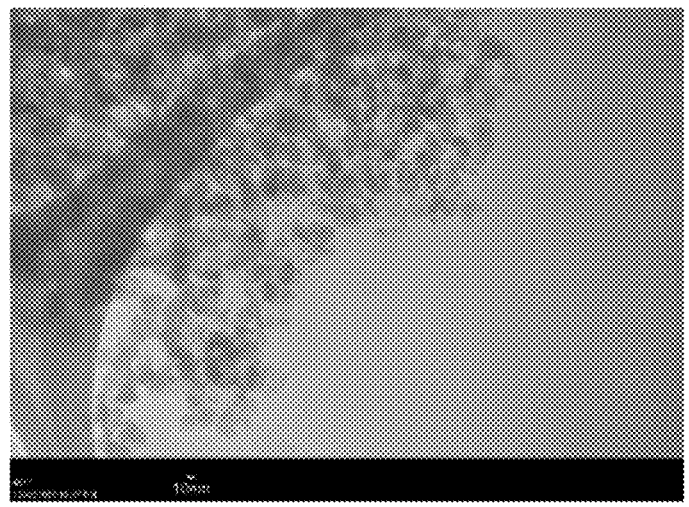
FIG. 2 is a TEM micrograph of coated carbon black
Figure 3:
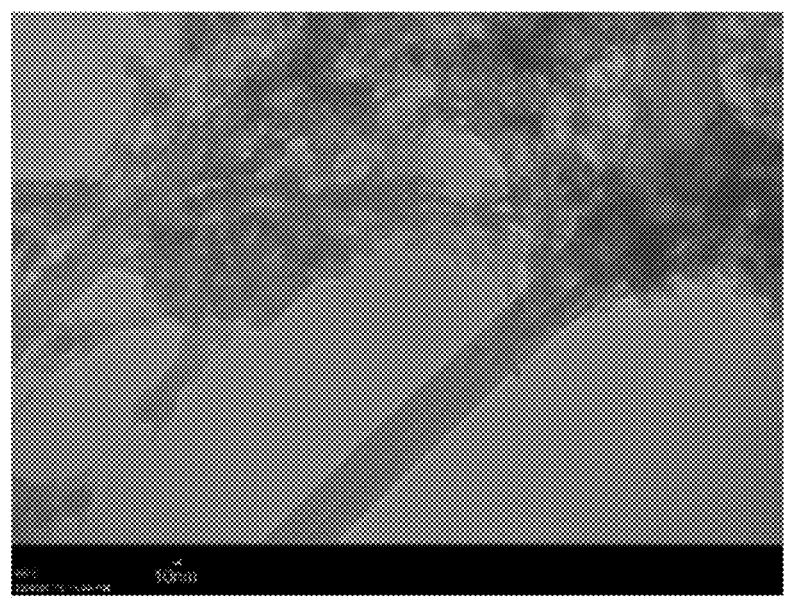
FIG. 3 is a TEM micrograph of the ash, after carbon burn-out

Aluminum hydroxide activated carbon black was further coated with silica. In a typical experiment 25 g of aluminum hydroxide activated carbon black was dispersed in 2250 mL of water using a high shear mixer. The temperature of the slurry was maintained between 75-80° C. In a separate container 18.70 g of 28% sodium silicate solution was mixed with 250 mL of water. The sodium silicate solution was treated with ion-exchange resin, and finally added to the carbon black slurry, at the rate of 4 mL/min. The pH of the solution was maintained around 4 using aqueous solutions of sodium hydroxide and hydrochloric acid. FIG. 2 shows a micrograph of carbon black after silica coating. FIG. 3 shows micrograph of silica ash obtained by burning silica coated carbon black in oxygen, which leaves silica residue. Note that the residue is in the form of silica shells (surface area: ~600 $m^2$/g). Thermo gravimetric analysis of silica coated carbon black showed that the silica content in the coated powder is 12-15%.

1.c Sulfur Modification of Silica Coated Carbon Black

To increase mercury removal efficiency of silica coated carbon, the powder was treated with elemental sulfur. In a typical example, silica coated carbon black powder was mixed with 5 wt % sulfur powder. 2 g of this powder was heated in a tube furnace at 400° C. for 6 hours in nitrogen atmosphere. The final amount of sulfur after heat treatment was 1.69%. This sample hereafter will be designated as C2. The specific area of the sorbent was 239 $m^2$/g. The specific surface area of unmodified carbon black was 260 $m^2$/g.

1.d Measurement of Mercury Removal Efficiency of C2

Figure 4:
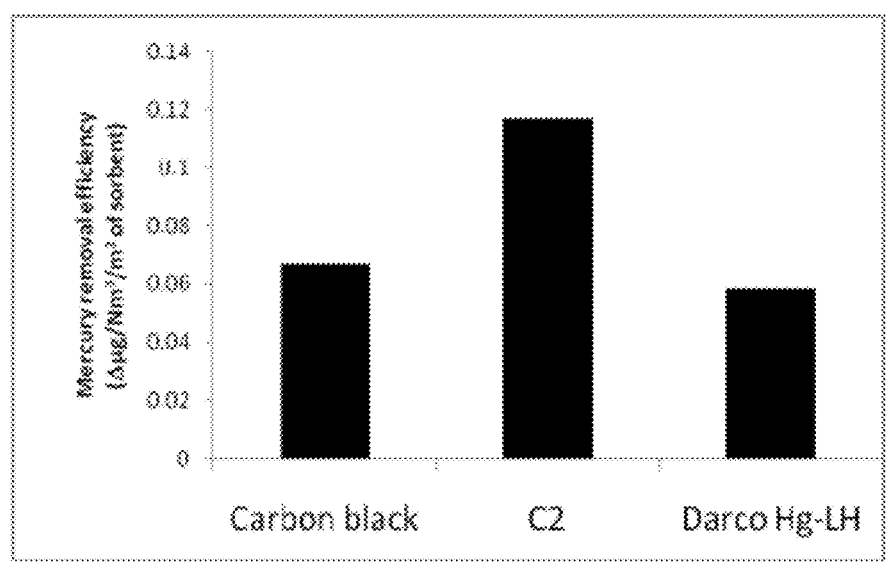
FIG. 4 depicts the mercury removal efficiency of sorbents carbon black, the inventive sorbent C2 and Darco Hg-LH.

The sorbents were tested for total vapor-phase mercury removal in a baghouse scenario for plants burning Powder River Basin sub-bituminous coal (PRB). The sorbent injection rate was 0.5 lb/Macf. The beginning mercury concentration in flue gas was between 11-16 µg/$Nm^3$. A commercial sorbent, Darco Hg-LH, with surface area ~500 $m^2$/g was also tested for comparison. FIG. 4 shows the specific mercury removal efficiency of carbon black, C2 and Darco Hg-LH, determined using per unit surface area of sorbent. The efficiency is calculated by dividing change in Hg concentration (Δµg/$Nm^3$) with surface area ($m^2$). The mercury removal efficiency of C2 is significantly higher than Darco Hg-LH, even though Darco Hg-LH has much higher surface area. This confirms that a higher internal accessible surface is needed for high mercury removal efficiency of the sorbent.

1.e Measurement of Foam Index of C2.

Figure 5:
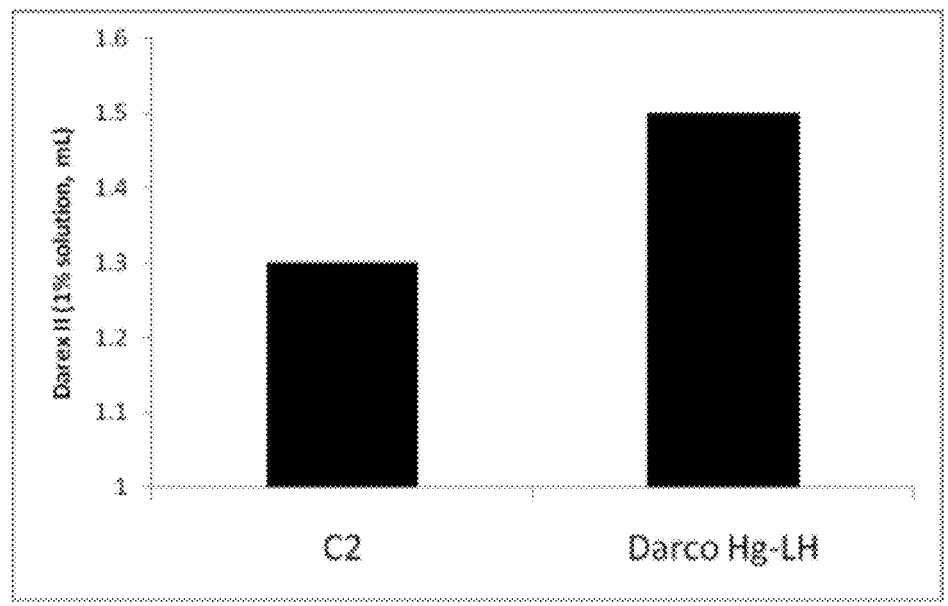
FIG. 5 depicts the foam index of C2 and Darco Hg-LH

The concrete friendliness of the sorbents was evaluated by the foam index test. The fly ash used for foam index measurements was from the same plant where the sorbents were evaluated. The AEA used for the test was Darex-II, manufactured by Grace Construction. Initially, 1 wt % sorbent material was mixed with fly ash, to simulate the concentration observed in fly ash, when carbon based sorbents are used for Hg removal. Subsequently, 4 g of fly ash was mixed with 16 g of Portland cement (Type 1), which is used in concrete formulations. The mixture was then dispersed in 50 ml of water. 1 wt % solution of Darex-II in water was added to the slurry. The end point of addition of AEA was when stable foam was observed for 45 seconds. FIG. 5 shows the foam index of C2 and compares it with Darco Hg-LH. The foam index of C2 is lower than Darco Hg-LH, indicating that C2 is more concrete friendly than Darco Hg-LH.

EXAMPLE 2

Synthesis and Performance of Activated Carbon (AC-1) Based Sorbent 2.a Synthesis of Activated Carbon Based Sorbent Activated carbon based sorbent was synthesized in a method similar to the method used to synthesize carbon black sorbent, as described before. In a typical experiment 30 g of activated carbon (surface area: 550 m$^2$/g) was dispersed in 2700 mL of water using a high shear mixer. Subsequently, an aqueous solution of sodium aluminate (0.6 sodium silicate in 180 mL of water) was treated with ion-exchange resin, prior to its addition to activated carbon slurry. The pH of the slurry was maintained between 9.7-9.8, using aqueous solution of hydrochloric acid and sodium silicate. The treated powder was filtered, followed by drying. Aluminum hydroxide functionalized activated carbon powder was silica coated, using sodium silicate. In a typical experiment, 30 g of functionalized powder was dispersed in 2700 mL of water. Sodium silicate solution (20.28 g 28% sodium silicate solution in 262 mL of water), was treated with ion-exchange resin, prior to its addition to carbon slurry. The temperature of the solution was maintained between 75° C. and 80° C. The pH of the slurry was kept at 4, using aqueous solutions of sodium hydroxide and hydrochloric acid. The slurry was filtered and dried in oven. This powder is designated as C1. The surface area of this powder was 508 m$^2$/g. C1 sorbent was further treated with sulfur to increase its mercury removal efficiency. In a typical experiment, C1 was mixed with 5 wt % of elemental sulfur powder. The mixture was heat treated at 400° C. in inert atmosphere. This sorbent is designated as C3. The sulfur content of C3 is 2.99%, and surface area is 479 m$^2$/g.

2.b Performance of C1 and C3

Figure 6:
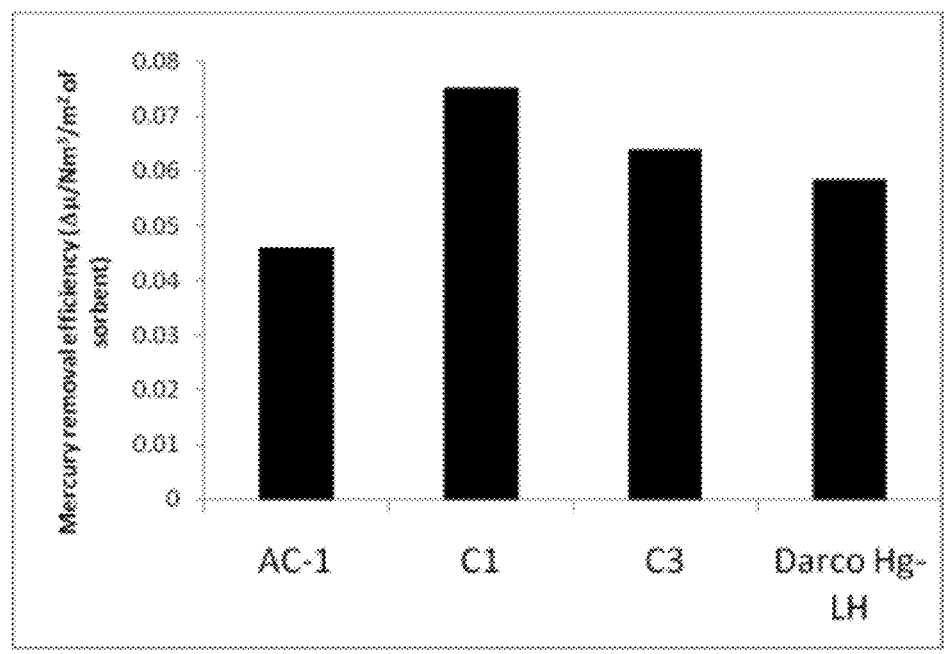
FIG. 6 depicts the mercury removal efficiency of sorbent, the inventive sorbents AC-1, C1, C3, and Darco Hg-LH.
Figure 7:
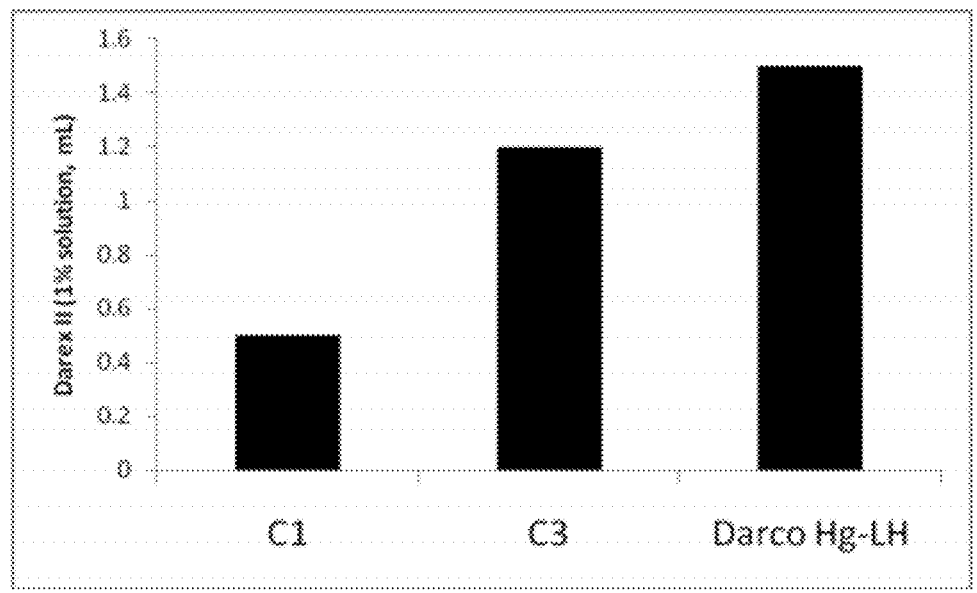
FIG. 7 depicts the foam index of C1, C3 and Darco Hg-LH

C1 sorbent was tested for mercury removal efficiency, using the method described above. FIG. 6 shows the mercury removal efficiency of AC-1, C1 and C3, in conjunction with Darco Hg-LH. Once again, the mercury removal efficiency of C1 and C3 is higher than Darco Hg-LH, even though the surface areas are comparable. This is due to their more open structure of this carbon than Darco Hg-LH. FIG. 7 shows the foam index of C1 and C3, and compares it with Darco Hg-LH. The foam index of C1 is ⅓$^{rd}$ that of Darco Hg-LH, indicating that it is significantly more concrete friendly than Darco Hg-LH.

EXAMPLE 3

Synthesis and Performance of Activated Carbon (AC-2) Based Sorbent Another activated carbon (AC-2) with different surface area (600 m$^2$/g) and particle morphology was modified to increase its mercury removal efficiency. The sorbent was synthesized in a manner similar to the method described to synthesize C1. Silica coated sorbent synthesized using AC-2, is designated as C5. No sulfur modification was performed for this carbon. The silica content for the sorbent was around 20 wt %. The surface area of the modified AC-2 was 371.8 m$^2$/g.

Figure 8:
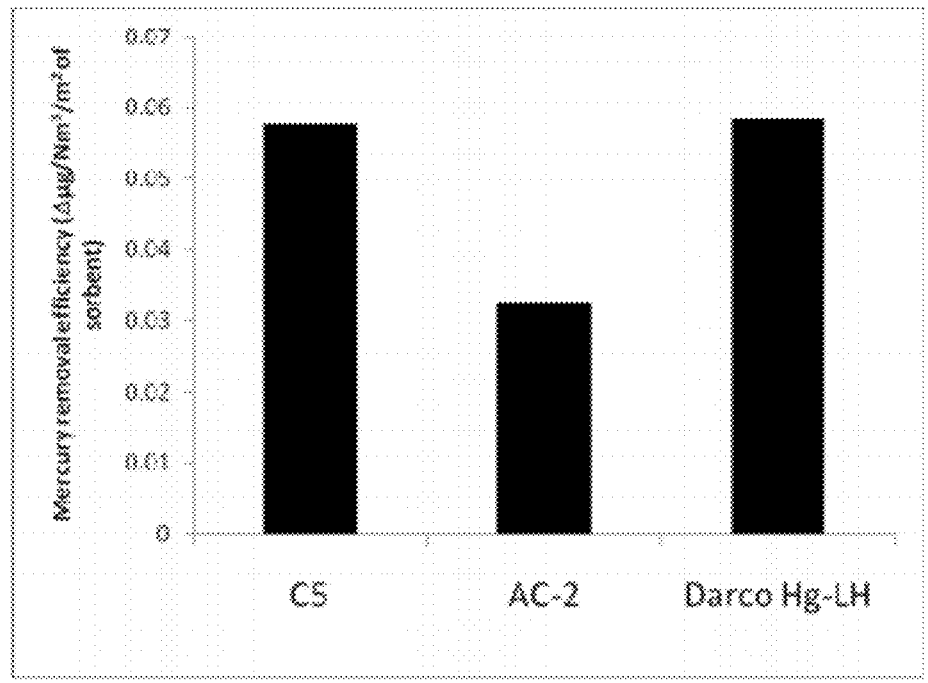
FIG. 8 depicts mercury removal efficiency of the inventive sorbent C5 and Darco Hg-LH.

FIG. 8 shows the mercury removal efficiency of AC-2 and C5. The sorbent injection rate was 0.5 lb/Macf. The AC-2 increased significantly after surface modification.

The present invention clearly demonstrates that an open pore structure, with suitable surface modification can lead to significant improvement in the efficiency of the sorbent to remove mercury from flue gas.

As is well known, the formula parameters set forth herein are for example only, such parameters can be scaled and adjusted in accordance with the teaching of this invention. This invention has been described with respect to preferred embodiments. However, those skilled in the art will recognize, modifications and variations in the specific details which have been described and illustrated may be restored to, without departing from the sprit and scope of the invention as defined in the appended claims.

We claim:

1. A sorbent to remove mercury from a gas, comprising:
   a) an inorganic substrate;
   b) a tying layer disposed on the inorganic substrate; and
   c) a metal oxide layer disposed on the tying layer;
   wherein the tying layer is disposed between the inorganic substrate and the metal oxide layer to increase adhesion between the inorganic substrate and the metal oxide layer; and
   wherein said tying layer comprises at least one of aluminum hydroxide, titanium hydroxide, magnesium hydroxide, iron hydroxide, and copper hydroxide.

2. The sorbent as claimed in claim 1 wherein said substrate is composed of at least one of: carbon, ceramic oxides, ceramic non-oxides and clay-based particles.

3. The sorbent as claimed in claim 1 wherein said substrate comprises activated carbon.

4. The sorbent as claimed in claim 1, wherein said metal oxide layer comprises at least one of silicon oxide, aluminum oxide, titanium oxide, iron oxide and tin oxide.

5. The sorbent as claimed in claim 1, wherein said metal oxide layer further includes sulfur molecules to increase its mercury removal efficiency.

6. The sorbent as claimed in claim 5, wherein said sulfur molecules comprise at least one of: elemental sulfur, mercaptosilane, and calcium polysulfide.

7. The sorbent as claimed in claim 1, wherein the concentration of metal oxide layer on the substrate comprises 7-16 wt % of the total sorbent.

8. The sorbent as claimed in claim 1, wherein the concentration of metal oxide layer on the substrate comprises 10-12 wt % of the total sorbent.

9. An improved carbon-based sorbent to remove mercury from flue gas, comprising:
   a) a carbon substrate
   b) a tying layer disposed on the carbon substrate
   c) a metal oxide layer disposed on the tying layer
   wherein the tying layer is disposed between the carbon substrate and the metal oxide layer to increase adhesion between the carbon substrate and the metal oxide layer; and
   wherein said tying layer comprises at least one of aluminum hydroxide, titanium hydroxide, magnesium hydroxide, iron hydroxide, and copper hydroxide.

10. The sorbent as claimed in claim 9 wherein said carbon substrate comprises activated carbon.

11. The sorbent as claimed in claim 9, wherein said metal oxide layer comprises at least one of silicon oxide, aluminum oxide, titanium oxide, iron oxide and tin oxide.

12. The sorbent as claimed in claim 9, wherein said metal oxide layer further includes sulfur molecules to increase its mercury removal efficiency.

13. The sorbent as claimed in claim 12, wherein said sulfur molecules comprise at least one of: elemental sulfur, mercaptosilane, and calcium polysulfide.

14. The sorbent as claimed in claim 9, wherein the concentration of metal oxide layer on the substrate comprises 7-16% of the total sorbent.

15. A process for producing a sorbent to remove mercury from gas, comprising:

a) providing an inorganic substrate;
b) depositing a tying layer on the inorganic substrate to increase the adhesion between the inorganic substrate and subsequent layers, said tying layer comprising at least one of aluminum hydroxide, titanium hydroxide, magnesium hydroxide, iron hydroxide, and copper hydroxide; and
c) depositing a metal oxide layer on the surface of the tying layer, said metal oxide layer being of a different metal from that of said tying layer.

16. The process as claimed in claim 15, wherein said inorganic substrate comprises activated carbon.

17. The process as claimed in claim 15, wherein said metal oxide layer comprises silica.

18. The process as claimed in claim 15, wherein said metal oxide layer further includes sulfur molecules to increase its mercury removal efficiency.

19. The process as claimed in claim 18, wherein said sulfur molecules comprise at least one of: elemental sulfur, mercaptosilane, and calcium polysulfide.

* * * * *